United States Patent [19]

Jovanovic et al.

[11] 4,039,823
[45] Aug. 2, 1977

[54] METHOD FOR PROCESSING WORK PIECES, FOR TRANSMITTING AND PROCESSING INFORMATION BY MEANS OF LASER EMISSION AND APPARATUS FOR PERFORMANCE OF THE METHOD

[76] Inventors: Alexandre Jovanovic, 33, route du centre, 1723 Marly; Jürg Steffen, Dorf, 3655 Sigriswil, both of Switzerland

[21] Appl. No.: 552,998

[22] Filed: Feb. 25, 1975

[30] Foreign Application Priority Data

Feb. 26, 1974 Switzerland .......................... 2682/74

[51] Int. Cl.² ............................................... H04B 9/00
[52] U.S. Cl. ..................................... 250/199; 332/7.51
[58] Field of Search ....................... 250/199; 332/7.51; 350/163; 331/94.5 M

[56] References Cited

U.S. PATENT DOCUMENTS

| 3,373,380 | 3/1968 | Adler ................................. 250/199 X |
| 3,433,958 | 3/1969 | Lenzo et al. ........................... 250/199 |
| 3,551,840 | 12/1970 | Crowell ........................... 332/7.51 X |
| 3,582,819 | 6/1971 | Muller et al. .................... 332/7.51 X |
| 3,635,562 | 1/1972 | Catherin ............................... 250/199 |
| 3,638,137 | 1/1972 | Krupke ............................. 250/199 X |
| 3,834,790 | 9/1974 | Macken ............................ 250/199 X |

*Primary Examiner*—Benedict V. Safourek

[57] ABSTRACT

The present invention concerns a method for processing work pieces, for transmitting and processing information by laser emission. The method, according to the invention, contains a temporal emission of the laser in form of regular spikes, which can be resolved in single very short pulses by mode-locking. The spike train can be controlled individually.

13 Claims, 18 Drawing Figures

METHOD FOR PROCESSING WORK PIECES, FOR TRANSMITTING AND PROCESSING INFORMATION BY MEANS OF LASER EMISSION AND APPARATUS FOR PERFORMANCE OF THE METHOD

BACKGROUND OF THE INVENTION

Apparatus for procesing work pieces, for transmitting and processing information by means of laser emission.

This invention refers to apparatus for processing work pieces, for transmitting and processing information by means of laser emission.

The processing of work pieces by means of laser emission has been known for some years. In particular special laser arrangements, which allow one to attain reproducible processing results (CH-Pat. No. 505,677) at maximum efficiency and optimum processing quality, are known, as for instance as shown in the CH-Pat. Nos. 532,992 and 545,544.

The application of modulated laser pulses for the processing of thermal sensitive working materials, such as brittle, magnetic materials, etc. is shown by CH-Pat. No. 532,993 and CH-application for patent No. 10,089/73.

By the influence of light intensity by means of single regularly following spikes of a duration of approximately 1 $\mu$sec, only the material, which is vaporized, is heated. Consequently, the material which surrounds the processing spot remains thermally unaffected transparent, as well as reflecting materials can be processed by adapting the peak intensity and the duration of the spikes to the material to be processed.

But for several materials and, specifically, transparent work materials, processing is not possible even with this method or is only possible with extremely high energy single spikes, which results in a small efficiency. This fact is based on insignificant light absorption, which means the coupling, between light wave and lattice vibration, is so small for several materials, as for instance quartz, glass etc. that either nothing is happening, or the light energy heats or influences too large an area. For processing such materials a laser-emission is required which is modulated with a frequency on order of magnitude of the eigen-frequency of one lattice vibration of this material. In other words this means that one has the advantage of the photon-phonon interaction. The absorption of the laser emission is caused by the electric dipole moment of first or second order or by anharmonic terms in the potential energy. Absorption reactions of higher orders may be caused by simultaneous interaction of the radiation field with two or more vibration states of the lattice.

A modulation of the laser emission in the desired frequency range is made possible by so-called "mode-locking". Apart from effects of higher order the mode-locking is a stationary beat of the eign oscillations of the laser light in the resonator, of such kind, that the product of the pulse length and the bandwidth of the amplifying medium is about one. The spiking is a beat of the intensity of the laserlight with the excited states of the amplifying medium, so that the logarithm of the light intensity approximates a sine function.

The resonance frequencies of mode-locking and spiking lie in totally different frequency ranges:
10 MHz–10 GHz, typically 300 MHz for mode-locking and 10 kHz–10 MHz, typically 300 kHz for spiking.

These two beats can be excited independently and because of the small required depth of modulation both beats can be excited with the same modulator. Under certain circumstances this modulator can in addition be used as output modulator.

Because of different depths of modulations and favourable frequency ranges it is advantageous to adapt the fundamental resonance of the modulator to the spiking frequency.

Simultaneous Q-switching and mode-locking with a single modulator inside of a resonator is known from the U.S. Pat. No. 3,763,443. This is obtained by modulation with a FM-signal, the center frequency of which is out-of-tune with respect to the mode-locking frequency. However the depth of modulation has to be almost one, what complicates a practical application.

A method for amplitude and phase coupling of several equidistant laser transitions in molecular lasers, for instance $CO_2$ lasers, is known from the U.S. Pat. Nos. 3,550,031 and 3,493,894. This method however produces only a regular train of single pulses with a separation given by the laser gas.

It is known, that the biggest bandwidth for information transmittance is obtained, when pulse trains are modulated parallely in many channels and by using the time multiplex method. Therefore a high frequency modulator of narrow band and a modulator of broadband are used, as is shown in CH-Pat. No. 541,816. For data processing high frequency modulated light sources of narrow band are needed, as for instance in optical transformations and correlators in holography and for instance in demultiplexing of the above mentionned information trains (CH-Pat. No. 553,459).

Corresponding to the state of technique more than one modulator is required in general for generation of a modulation and of mode-locking and, if needed, for control of the pulse train. But this is very disadvantageous and it may be expensive too. Additionally the conventional modulation systems have low driving oscillation efficiency.

The purpose of this invention is to create a method of and an apparatus for the processing of work pieces and for transmitting and processing information by laser emissions; a method and an apparatus which generate simultaneously mode-locking and spiking with a single modulator and which further make possible control of pulsetrains. Additionally the energy transfer has to be increased.

The method according to the invention is characterized by a temporal emission of the laser in form of regular spikes which can be resolved in single very short pulses by mode-locking. This approach is characterized by the possibility of a control of the intensity of the spike train.

By this method the transfer of light energy in the material to be processed is optimum, because the mode-locking excites acoustical phonons caused mainly by electrostriction. Therefore work material, which is extremely resistant to generally used laser emission can be processed by this method.

Additionally the apparatus to perform the given task has to enable a modulation of a narrow band.

The apparatus according to the invention is characterized by adding a modulator to the laser resonator generating as well a phase modulation as an amplitude modulation of the laser radiation and therefore being able to produce simultaneously a modulation (spiking), a mode-locking and a control of the intensity of the spike train.

This apparatus allows the generation of the spiking and the mode-locking by extremly small driving voltage (~1 V). The laser resonance for mode-locking is sharp: Q-value $\geq 10^3$, and for the spiking flat: Q-value ~3. By using the modulator as out-put modulator a third signal outside of the two resonances can control simultaneously the degree of the laser out-put.

For this out-put control one has to take care, that the mode-locking and spiking is not disturbed by the shift of the working point caused by the needed large modulation depth.

In all applications it is reasonable to store the unused power in the laser resonator, especially at high powers. Therefore, out-put modulators enable optimum energy profit.

Outside the resonances the needed driving power for a given modulation depth and frequency component is proportional to the modulation frequency. In the resonance the needed driving power is indirectly proportional to the mechanical resonator quality $Q_m$. In addition, the attainable relative band-width is also indirectly proportional to the mechanical resonator quality. The minimum driving power per band-width can be reached by adapting the mechanical resonator quality $Q_m$ to the band-width $\Delta f$ and by adapting the eigen-frequency of the modulator to the carrier frequency $f$.

$$f_0 = f$$

$$\Delta f \cdot Q_m \approx f_0$$

The maximum attainable mechanical resonator quality is limited by the losses of the mechanical and partially electrical oscillators in the resonator and it can reach values on the order of magnitude of $10^6$ in quartz and $10^8$ in Li Nb O$_3$.

The state of the art teechnique and the invention are described in detail by the drawing figures and the accompanying captions.

BRIEF DESCRIPTION OF THE DRAWING

FIG. 11b is a detail of FIG. 11a;

FIGS. 1 to 5 represent prior art. In FIG. 1a, I represents intensity and t time. $T_s$ is the duration of one spike being resolved by mode-locking in single pulses of a duration $T_m$ with a separation $t_m$. In FIG. 1b, I is the intensity of a regular spike train, $T_s$ is the duration of a spike, $t_s$ the temporal separation of two spikes. In FIG. 2, 1 is a totally reflecting mirror, 2 is a partially transmitting out-put mirror, 3 is an amplifying medium and 4 the modulator. FIG. 3 differs from FIG. 2 only by the addition of a second modulator 5.

Figure 1A:
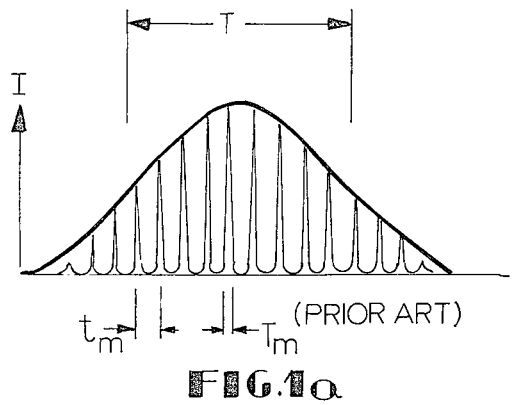
FIG. 1a is a spike resolved in single very short pulses by mode-locking.
Figure 1B:
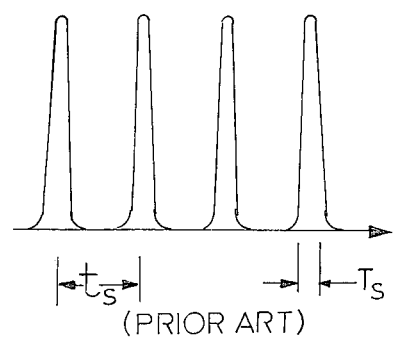
FIG. 1b is a conventional regular spike train.
Figure 2:
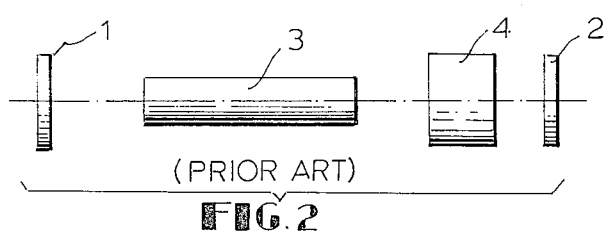
FIG. 2 is a prior art laser apparatus with a modulator for generation of spiking or of mode-locking.
Figure 3:
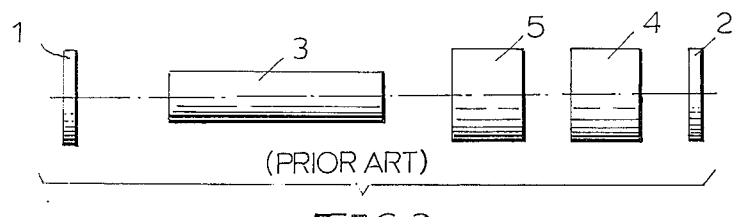
FIG. 3 is a corresponding apparatus with two modulators for generation of spiking and mode-locking.
Figure 4:
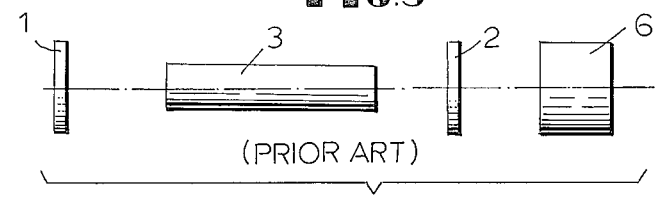
FIG. 4 is a prior art apparatus for control of the out-put emission with an external modulator.

A conventional apparatus for controlling of the out-put emission with an external modulator 6 is represented in FIG. 4. The conventional apparatus shown in FIG. 5 permits a simultaneous generation of spiking mode-locking in the out-put. The numerals correspond to the same elements shown in FIGS. 3 and 4.

Figure 5:
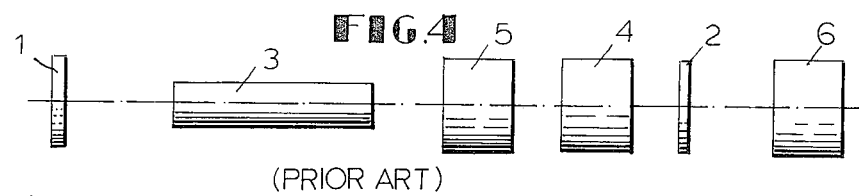
FIG. 5 is a prior art apparatus for simultaneous generation of spiking, mode-locking and out-put control.
Figure 6:
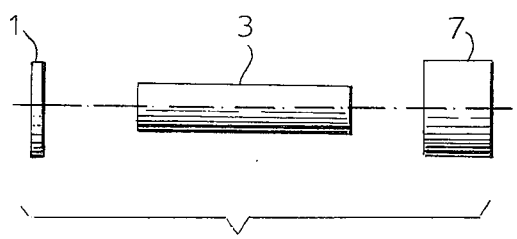
FIG. 6 is a laser apparatus with one modulator corresponding to this invention for generation of spiking, mode-locking and eventually out-put control.
Figure 7:
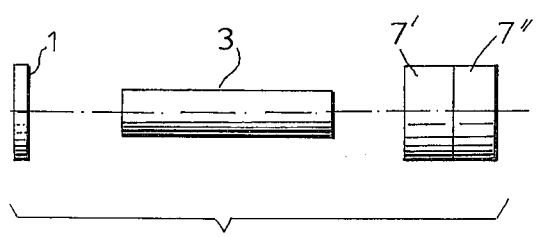
FIG. 7 is a laser apparatus with a double-modulator according to the invention for spiking, mode-locking and out-put control.

These prior art apparatus are, as mentioned in the introduction, not satisfactory, because either they do not fulfill all the requirements regarding to the technical possibilities or, as is shown clearly in FIG. 5, they need several different elements. The sensitivity to disturbance of the apparatus is essentially thereby increased and the efficiency is reduced.

The apparatus according to the invention is characterized, as mentioned above, by a modulator added to the laser resonator causing the resonator to generate an amplitude modulation and a phase modulation of the light waves simultaneously. The concept of this modulator is in the form of a Fabry-Perot interferometer of variable length and fulfills simultaneously all the requirements, making possible the generation of mode-locking for producing ultra short pulses and the generation of a beat for producing spikes and for controlling the spike train. In addition it has good energy transfer of the driving oscillation in the modulation and it permits a reduction of the number of optical elements in the resonator compared with prior art modulators.

The resonator configuration for the use of the apparatus in material processing is designed preferably according to the teachings of Swiss Pat. No. 545,544.

According to the invention electrical, acoustical or magnetic optical volume modulators can, at small and medium laserlight-powers, be used with an out-put modulator by mirrored surfaces with the matches reflectivity. At larger lightpowers the choice of the materials is, because of the light-sensibility of the surfaces, restricted to materials with small electrical, acoustical or magnetic optical effects. According to the invention a mirror of the laser resonator is therefore replaced by two or more planar parallel optical discs to form one kind of a transducer driven modulator.

Between the single discs and between the mount and discs vibrating piezoelectrical discs are placed with a concentric hole of the dimension of the laser beam. Depending on the light, an increase or decrease of the reflection by means of reflecting coatings is favorable. Because of the optical bandwidth and because of technical difficulties, the number of the discs is chosen as small as possible, and is preferably limited to two. The reflection of two non-coated discs, e.g., the layers of the discs are sufficiently coated for instance with germanium discs for $CO_2$-lasers or with diamond discs for lasers in the visible light range.

The best exploitation of the reflection at the surfaces exists if the optical paths between the surfaces are equal, and represent interferometrical maximum reflection.

Figure 8:
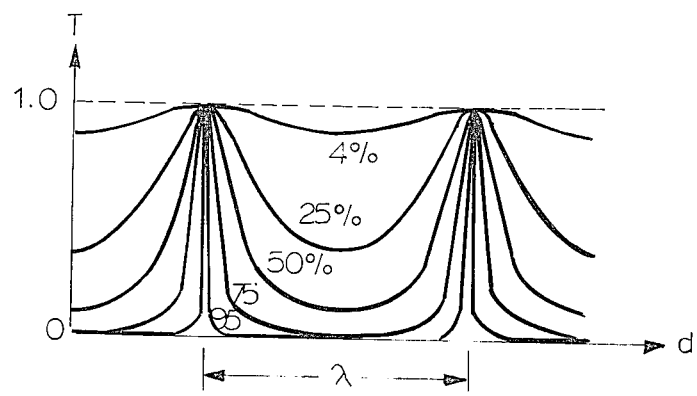
FIG. 8 is the transmission of a Fabry-Perot-Interferometer as function of the distance of the two mirror surfaces.

The transmission $T = I/I_o$ of such a Fabry-Perot interferometer is shown in FIG. 8 as function of the distance of the two discs. This parameter is determined by the reflection of the mirror. This figure illustrates, that with a mirror reflection of 95%, the transmission can be varied by 97% by changing the distance by 0.1 $\mu$m.

Figure 9:
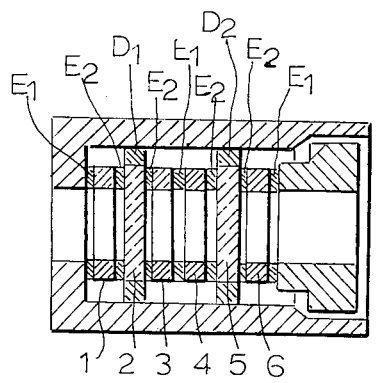
FIG. 9 is an apparatus corresponding to an out-put mirror with variable transmission.
Figure 10:
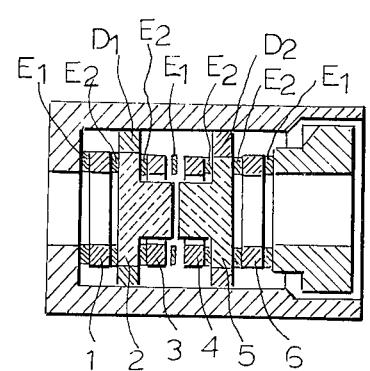
FIG. 10 is another embodiment of a similar apparatus such as that described in FIG. 9.

The mount of the discs has to be rigid, so that no disturbing vibrations of the mount are induced. The center of gravity of the discs should not move during the displacements; in addition the total of the laser resonator length has to remain constant. FIG. 9 shows a longitudinal arrangement with two discs 2 and 5 and four piezoelectric hole-discs 1, 3, 4 and 6. The mechanical resonator quality $Q_m$ of the modulator can be adapted by damping elements $D_1$ and $D_2$. $E_1$ and $E_2$ are electrodes, which are connected to a driven signal generator. The working point can be adjusted exactly by a direct voltage at the electroes $E_1$ and $E_2$. The rough adjustment is performed mechanically. To increase the optical bandwidth, the distance between the mirrors may be made much smaller (for instance 5 $\mu$m) the thickness of the piezoelectric discs lying between (e.g. 5 mm). FIG. 10 shows a similar modulator to the one in FIG. 9 with such a small mirror distance. If the displacement is is sufficient, several piezoelectric discs may be used.

Figure 11A:
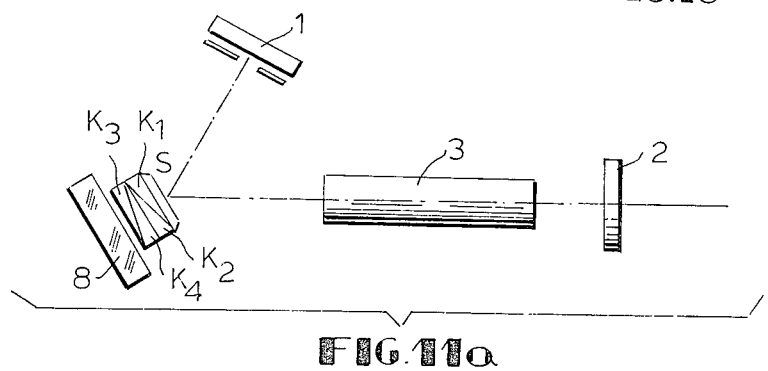
FIG. 11a an apparatus for the piezoelectric generation of a beam deflection in a resonator.
Figure 11B:
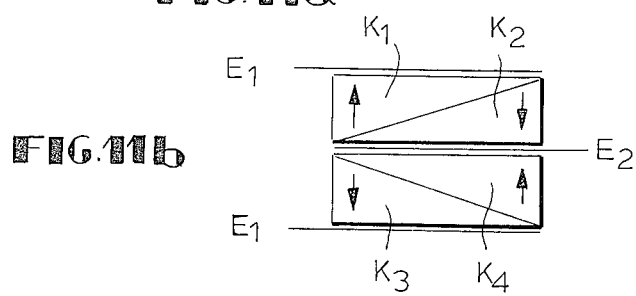

FIG. 11a represents another modulator 8 of the same family of transducer driver modulators, according to the invention. Piezoelectric wedges $K_1$, $K_2$, $K_3$ and $K_4$ are stacked, with the polarisation of two wedges $K_1$ and $K_2$, and $K_3$ and $K_4$ being antiparallel ( ↓ ↑ ), as is shown in FIG. 11b. If a direct voltage is applied on the electrodes E, and $E_2$ a wedging is produced which can be increased by using several of such wedge-pairs. One surface is connected with a rigid mount, on the second surface a mirror S is fixed, as is shown in FIG. 11a.

By applying a voltage to this modulator produces a deflection of the beam axes. In a resonator with an aperture B, as shown on FIG. 11a, this leads to a change of the optional resonator quality and, with an adapted voltage frequency, to the desired modulation. In addition the neutral inclination position of the mirror can be adjusted exactly by a corresponding direct voltage.

Volume modulators are based on the polarizability of the atoms by the outer electrical, magnetic or mechanical field and on their deformations thereof. Each outer field causes a deformation and therefore mechanical vibrations are excited by every alternating field. At a constant amplitude the resonances of this field may arise depending on the frequency, with an increase of the amplitude which is; about of the same order of magnitude as the mechanical resonator quality $Q_m$ of the modulator.

Transducer driven modulators, where the modulation is produced by a transducer induced surface movement, show in principle the same oscillation behaviour.

This invention also deals with high frequency modulators which allow an adaption of their mechanical $Q_m$ and fo to $\Delta f$ and $f$, and which are used to perform the method according to the invention.

The modulator according to the invention is set up as symmetrical as possible regarding the vibrations to be excited, so that the energy of the vibrations to be excited is not dissipated by vibrations of the mount and to prevent exciting of undesired vibrating modes.

The mechanical coupling between the mount and the modulator, i.e., the desired damping is adapted to $Q_m$ resulting from above considerations; at pure resonance modulation the mechanical coupling is made as soft as possible for these vibrations along the nodal surfaces of the vibration to be excited. Because of the desired optical quality and homogeneity any stationary deformation has to be avoided. The coupling of every transverse vibration producing a local moment of torsion between the crystal and the mount, one has to take care, that no transverse surface vibrations arise at direct modulators, which is realized by the symmetry of the construction and by a mount absorbing transverse deformations as completely as possible. At transducer modulators the symmetry conditions have to be fulfilld so that either no transverse surface vibration arises or so that the the moments of torsion and of the forces of the transverse vibrations integrated over on the coupling surface disappear.

In the following, different types of volume modulators, according to the invention, properties for the modulation by movement of the modulator are set forth.

Figure 12:
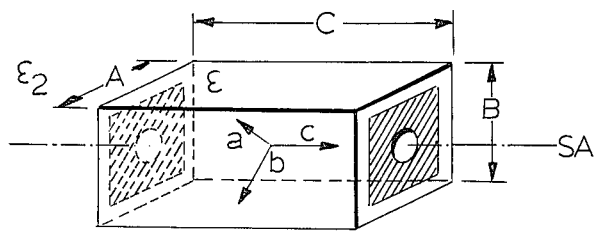
FIG. 12 is an arrangement of the electrodes of a longitudinal modulator.

For longitudinal EO-Modulators (FIG. 12) of the crystal symmetry $D_2d$ (e.g. KDP), $D_2$ (e.g. $HIO_3$) and $T_d$ (e.g. AIP) the electrodes have to be as thin as possible and A ≤ B. The side surfaces are uniformly and symmetrically embedded in a material of a permittivity $\epsilon_2$ ($\epsilon_2 < < \epsilon$ permittivity of the crystal) and having mechanical properties between that of foam rubber depending on the desired mechanical quality $Q_m$ and hard rubber; SA being the beam axe $a$, $b$, $c$, the crystal axes and the hetched surfaces the electrodes.

For transverse EO-Modulators (FIG. 13) of the crystal symmetry $D_3$ (e.g. $\alpha$- $SiO_2$), $D_6$ (e.g. $\beta$- $SiO_2$) and $T_d$ (e.g. EIP) a torsion movement is unavoidable, the coupling being minimin at the mounting the surfaces perpendicular to the a-axe.

Figure 13:
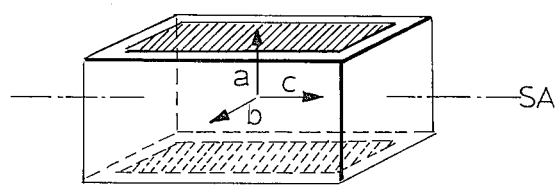
FIG. 13 is an arrangement of the electrodes of a transverse modulator.
Figure 14:
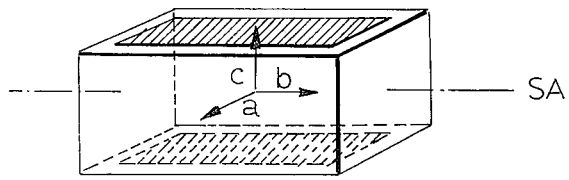
FIG. 14 is an other arrangement of the electrodes for a transverse modulator.

The transverse modulators (FIG. 14) of the symmetry C, $C_{3V}$ (e.g. $LiNbO_3$), $C_{6V}$ (e.g. polarised ceramics) which show small natural birefringence are used analoguely to the modulators described by FIG. 13, however, the surfaces $a$ and $b$ are interchanged at the $C_{3V}$ symmetry their direction is irrelevant at the $C_{6V}$ symmetry. The mounting is performed advantageously along the same surfaces, as described by FIG. 12.

For modulators used within the laser resonator, where a small remaining reflection of the crystal surfaces disturbs, or where surface damage arises at high powers, an apparatus characterized by Brewsterangle is proposed, according to the invention.

Figure 15A:
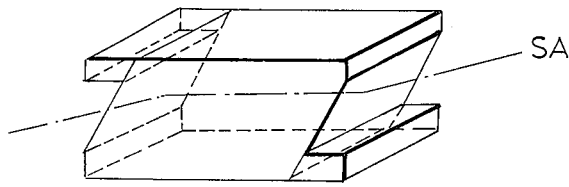
FIG. 15a is the geometrical shape of a crystal for preventing beam reflection.
Figure 15B:
FIG. 15b is another shape of a crystal for preventing beam reflection.

For symmetry considerations an apparatus according to FIG. 15a or FIG. 15b is advantageous.

For magneto-optic and siezo-electric transducer driven modulators the same considerations are valid; the excitation of the modulator not being performed by an electrical field, but by a magnetic or mechanical field of a transducer.

At high light intensities, especially in the infrared-region, the modulation by a Fabry-Perot-filter has essential advantages. This filter consists, for instance, of two or more planar parallel optical discs. Depending on the laser wavelength and on the optical disc material an increase or a decrease of the reflection of the discs surfaces by coating may be favorable.

The two methods according to the invention, i.e., Fabry-Perot-filter and EO-Modulator may be combined by reflective coating of the end surfaces of the volume-EO-Modulators.

Depending on the desired mechanical resonator quality $Q_m$ and on the desired heat or electrical conductivity of the surrounding material soft metals are suitable, for example $I_n$, which is yet temperature limited, such as Pb, Au, Ag, etc., also important are polymerized and mastic materials, such as Araldit (registered trade-mark) with adapted setting up. To fill the spacings, gases, for index matching optic inversion fluids, and mercury (Hg) for the electrodes are used. The electrode surface should be, as large as the crystal surface, because of field homogeneity.

What we claim is:

1. A modulator for use in a laser resonator, wherein the modulator is used to produce mode-locking, spiking and output modulation, said modulator comprising: crystalline vibrating means having eigen-frequencies including a fundamental eigen-frequency $f_o$, which is equal to the mean frequency of spiking and a mechanical resonator quality equal to $f_o/\Delta f_s$, wherein $\Delta f_s$ is the bandwidth of spiking.

2. A modulator, according to claim 1, wherein one of the higher eigen-frequencies of said vibrating means is equal to the mode-locking frequency.

3. A modulator, according to claim 1 wherein said vibrating means is symmetrical relative to a plane, which is perpendicular to the laser beam axis.

4. A modulator, according to claim 1 wherein the center of gravity of said vibrating means remains immobile during modulating.

5. A modulator, according to claim 1, wherein said vibrating means comprises an electro-optic crystal placed in the optical path of the laser resonator, which acts on the length of said optical path with mechanical deformations.

6. A modulator, according to claim 1, wherein said vibrating means comprises an electro-optic crystal placed at one end of the laser resonator, so as to function as a Fabry-Perot-Interferometer.

7. A modulator, according to claim 1, wherein both end surfaces of said crystal are coated.

8. A modulator, according to claim 1, wherein said vibrating means comprises a pair of wedges of piezoelectric material, reflecting means fixed to said pair of wedges, and an aperture through said reflecting means, wherein said reflecting means and said aperture are placed in the optical path of the laser resonator.

9. A modulator, according to claim 1, wherein said vibrating means comprises a plurality of pairs of wedges of piezo-electric material.

10. A modulator, according to claim 1, wherein said vibrating means comprises two planar optical discs, which are parallel, each disc being clamped between two rings of piezo-electric material.

11. A modulator, according to claim 10, wherein said two optical discs are clamped by said rings disposed peripherally thereabout, wherein the optical discs are thinner at the periphery thereof than the center thereof, and wherein the separation between the discs is of the order of 10μm.

12. A modulator, according to claim 10, wherein said two optical discs are coated.

13. A modulator for use in a laser resonator, wherein the modulator is used to produce mode-locking, spiking and output modulation, said modulator comprising:
vibrating means including two planar, parallel optical discs wherein each disc is clamped between two rings of piezo-electric material disposed about the periphery of each disc, wherein each disc is thinner at the periphery thereof than at the center thereof, wherein the separation between the discs is in the order of 10μm, and wherein
the vibrating means has eigen-frequencies including a fundamental eigen-frequency $f_o$, which is equal to the mean frequency of spiking and aa mechanical resonator quality equal to $f_o/\Delta f_s$, wherein $\Delta f_s$ is the bandwidth of spiking.

* * * * *

UNITED STATES PATENT OFFICE
CERTIFICATE OF CORRECTION

Patent No. 4,039,823                    Dated August 2, 1977

Inventor(s) JOVANOVIC, ET AL.

It is certified that error appears in the above-identified patent and that said Letters Patent are hereby corrected as shown below:

Claim 1, line 4, delete "crystalline"
Claim 1, line 4, after "having", insert -- mechanical --
Claim 1, line 5, after "fundamental", insert -- mechanical --

Signed and Sealed this

Sixth Day of December 1977

[SEAL]

Attest:

RUTH C. MASON
Attesting Officer

LUTRELLE F. PARKER
Acting Commissioner of Patents and Trademarks